United States Patent
Park et al.

(10) Patent No.: US 10,318,188 B2
(45) Date of Patent: Jun. 11, 2019

(54) METHOD OF CONTROLLING MEMORY CELL ACCESS BASED ON SAFE ADDRESS MAPPING

(71) Applicant: SAMSUNG ELECTRONICS CO., LTD., Suwon-si, Gyeonggi-do (KR)

(72) Inventors: Young-Jin Park, Incheon (KR); Chan-Ik Park, Suwon-si (KR); Won-Seok Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 193 days.

(21) Appl. No.: 15/345,684

(22) Filed: Nov. 8, 2016

(65) Prior Publication Data

US 2017/0131927 A1    May 11, 2017

(30) Foreign Application Priority Data

Nov. 11, 2015    (KR) .................. 10-2015-0158097

(51) Int. Cl.
*G06F 3/06* (2006.01)
*G06F 12/10* (2016.01)

(52) U.S. Cl.
CPC .......... *G06F 3/0619* (2013.01); *G06F 3/0622* (2013.01); *G06F 3/0634* (2013.01); *G06F 3/0644* (2013.01); *G06F 3/0673* (2013.01); *G06F 12/10* (2013.01); *G06F 2212/1032* (2013.01); *G06F 2212/20* (2013.01)

(58) Field of Classification Search
CPC .................................................. G06F 12/1483
USPC .................................................... 365/230.03
See application file for complete search history.

(56) References Cited

U.S. PATENT DOCUMENTS

| | | |
|---|---|---|
| 5,953,746 A | 9/1999 | Crocker et al. |
| 6,807,106 B2 | 10/2004 | Gonzales et al. |
| 7,146,456 B2 | 12/2006 | Suh |
| 7,480,199 B2 | 1/2009 | Morgan et al. |
| 8,065,467 B2 | 11/2011 | Micheloni et al. |
| 8,938,573 B2 | 1/2015 | Greenfield et al. |
| 9,117,544 B2 | 8/2015 | Bains et al. |
| 2005/0289294 A1 | 12/2005 | Janzen |
| 2007/0271433 A1 | 11/2007 | Takemura |
| 2011/0007542 A1* | 1/2011 | Lin ................. G11C 17/16 365/94 |

(Continued)

FOREIGN PATENT DOCUMENTS

KR    10-2004-0076454    9/2004

*Primary Examiner* — Min Huang
(74) *Attorney, Agent, or Firm* — F. Chau & Associates, LLC

(57) ABSTRACT

A memory access control method that can prevent a cell hammer phenomenon includes setting at least a part of all the memory cells a safe memory region, and setting the remaining memory cells to a normal memory region. In the safe memory region, some cells set to an enabled state are accessible for data writing or reading, and the remaining cells set to a disabled state are inaccessible. Based on a safe address mapping algorithm, access to all memory cells in the safe memory region is controlled such that access to the enabled memory cells is allowed and access to the disabled memory cells is prevented. The enabled memory cells in the safe memory region are spaced apart from each other by at least one disabled memory cell in a horizontal and/or vertical direction.

13 Claims, 23 Drawing Sheets

(56) References Cited

U.S. PATENT DOCUMENTS

| | | | |
|---|---|---|---|
| 2011/0058431 A1* | 3/2011 | Gunwani | G11C 29/40 365/189.16 |
| 2013/0201746 A1* | 8/2013 | Chung | G11C 17/16 365/96 |
| 2014/0177370 A1 | 6/2014 | Halbert et al. | |
| 2014/0189278 A1* | 7/2014 | Peng | G06F 12/0223 711/170 |
| 2016/0041928 A1* | 2/2016 | Lesartre | G06F 12/0246 711/163 |
| 2016/0055338 A1* | 2/2016 | Jeansonne | G06F 21/575 713/2 |

\* cited by examiner

NORMAL MEMORY MODE

PHYSICAL MEMORY

NORMAL-SAFE
HYBRID
MEMORY MODE

SAFE MEMORY MODE

NORMAL-SAFE HYBRID
MEMORY MODE

FIG. 12A

|    | $C_1$ | $C_2$ | $C_3$ | $C_4$ | $C_5$ | $C_6$ |
|----|---|---|---|---|---|---|
| $R_1$ | 1 |   | 1 |   | 1 |   |
| $R_2$ |   | ① | ← | ① | ← | ① |
| $R_3$ | 1 |   | 1 |   | 1 |   |
| $R_4$ | ← | ① | ← | ① | ← | ① |
| $R_5$ | 1 |   | 1 |   | 1 |   |

FIG. 12B

|    | $C_1$ | $C_2$ | $C_3$ | $C_4$ | $C_5$ | $C_6$ | $C_7$ |
|----|---|---|---|---|---|---|---|
|    |   | 1 |   | 1 |   | 1 |   |
|    | 1 |   | 1 |   | 1 |   | 1 |
|    |   | 1 |   | 1 |   | 1 |   |
|    | 1 |   | 1 |   | 1 |   | 1 |
|    |   | 1 |   | 1 |   | 1 |   |

|   | C1 | C2 | C3 | C4 | C5 | C6 | C7 | C8 | C9 | C10 | C11 | C12 | C13 |
|---|----|----|----|----|----|----|----|----|----|-----|-----|-----|-----|
|   |    |    |    | 1  |    |    |    | 1  |    |     |     | 1   |     |
|   |    |    | 1  |    |    |    | 1  |    |    |     | 1   |     |     |
|   |    | 1  |    |    |    | 1  |    |    |    | 1   |     |     |     |
|   | 1  |    |    |    | 1  |    |    |    | 1  |     |     |     | 1   |
|   |    |    | 1  |    |    |    | 1  |    |    |     | 1   |     |     |
|   |    |    |    |    |    |    |    |    |    |     |     |     |     |
|   |    |    |    |    |    |    |    |    |    |     |     |     |     |

FIG. 14C

|   | C1 | C2 | C3 | C4 | C5 | C6 | C7 | C8 | C9 | C10 | C11 | C12 | C13 | C14 |
|---|----|----|----|----|----|----|----|----|----|-----|-----|-----|-----|-----|
|   |    |    |    | 1  |    |    |    | 1  |    |     |     | 1   |     |     |
|   |    | 1  |    |    |    | 1  |    |    |    | 1   |     |     |     | 1   |
|   |    |    | 1  |    |    |    | 1  |    |    |     | 1   |     |     |     |
|   | 1  |    |    |    | 1  |    |    |    | 1  |     |     |     |     | 1   |
|   |    |    | 1  |    |    |    | 1  |    |    |     | 1   |     |     |     |
|   |    |    |    |    |    |    |    |    |    |     |     |     |     |     |

METHOD OF CONTROLLING MEMORY CELL ACCESS BASED ON SAFE ADDRESS MAPPING

CROSS-REFERENCE TO RELATED APPLICATION

This U.S. non-provisional application claims priority under 35 USC § 119 from, and the benefit of, Korean Patent Application No. 10-2015-0158097, filed on Nov. 11, 2015 in the Korean Intellectual Property Office (KIPO), the contents of which are herein incorporated by reference in their entirety.

BACKGROUND

1. Technical Field

Embodiments of the present inventive concept are directed to a method that can more safely use a memory device, and more particularly to a memory cell access control method that can use safely a cell hammer phenomenon by applying safe address mapping for a desired memory area.

2. Discussion of the Related Art

The increasing integration of semiconductor memory devices has results in some newly emerging effects. One such effect is a so-called row hammer phenomenon. The row hammer phenomenon is an unintended side effect in dynamic random-access memory (DRAM) in which memory cells to leak their charges and interact electrically, possibly altering the contents of nearby memory rows that were not addressed in an original memory access. This row hammer phenomenon may occur not only in a row direction but also in a column direction. Thus, in general the phenomenon may be called a cell hammer phenomenon.

Current hardware-based solutions to prevent the cell hammer phenomenon need to be supported by the processor and the memory module for their actual applications. If there is no coordination between the relevant hardware vendors, these solutions may not be applied. In addition, the solutions may cause performance degradation in hardware, and have a further effect that once the memory cell performance has been physically decreased, the original performance may not be recovered.

SUMMARY

Embodiments of the present inventive concepts provide a memory access control method that can safely use a memory without the cell hammer phenomenon by applying safe address mapping to a desired region of the memory.

Some embodiments of the present inventive concepts further provide a memory access control method that can prevent the cell hammer phenomenon in software without causing unrecoverable loss of the memory device, in comparison with conventional hardware solutions for the cell hammer phenomenon.

Some embodiments of the present inventive concepts further provide a memory access control method that can use a safe memory mode and a normal mode at the same time, where the safe memory mode uses a desired part of the entire region of a memory device as a safe region free from the cell hammer phenomenon, with accepting reduction in the number of usable memory cells, and the normal mode uses the remaining region as a normal region of which all the memory cells are usable without reduction.

Furthermore, some embodiments of the present inventive concepts provide a memory access control method that can use a specific region of the memory device in safe memory mode by setting that mode, and restore the number of usable memory cells by setting the current mode to normal memory mode, if necessary.

According to exemplary embodiments of the present inventive concept, there is provided a method of controlling access to a memory device of a computing apparatus. The memory cell access control method includes setting at least a subset of memory cells of the memory device to an enabled state and a remainder of the memory cells to a disabled state. The enabled memory cells are accessible for data writing and reading, and the disabled memory cells are inaccessible. The method includes controlling access to the memory cells of the memory device such that access to the enabled memory cells is allowed and access to the disabled memory cells is prevented. The enabled memory cells are spaced apart from each other by at least one disabled memory cell in a horizontal and/or vertical direction.

In an exemplary embodiment, the setting step may include: setting at least a partial region of the memory cells to a safe memory region and a remaining region of the memory cells to a normal memory region; setting a subset of memory cells of the safe memory region to the enabled state and a remainder of the memory cells of the safe memory region to the disabled state; and setting all memory cells of the normal memory region to the enabled state.

In an exemplary embodiment, the controlling step may include: mapping a memory cell address to an address of an enabled memory cell based on a safe address mapping algorithm such that a memory cell address converted by the mapping is used to access memory cells of the safe memory region, when thea memory cell address to be accessed belongs to the safe memory region; and using the memory cell address without conversion to a different address to access memory cells of the normal memory region, when the memory cell address to be accessed belongs to the normal memory region.

In an exemplary embodiment, the safe address mapping algorithm may include steps for, calculating a first remainder by dividing a total number of columns in a cell array of the memory device by k, converting a memory cell address, Addr, to a value calculated by multiplying the memory cell address Addr by k, when said first remainder is not equal to zero; calculating a second remainder by dividing a current row number by 2 when said first remainder is equal to zero, converting the memory cell address, Addr, to a value of k*Addr−m, when said second remainder is equal to zero; and converting the memory cell address, Addr, to the value calculated by multiplying the memory cell address, Addr, by k, when the second remainder is not equal to zero, where k is an inverse of a capacity reduction ratio of the safe memory region and is a natural number greater than 1, and m is a natural number less than k.

In an exemplary embodiment, a safe address mapping filter implemented based on the safe address mapping algorithm is incorporated into the memory device, where the safe address mapping filter receives a memory cell address to be accessed and performs address mapping with respect to the enabled memory cells.

In an exemplary embodiment, a safe address mapping filter implemented based on the safe address mapping algorithm is incorporated into a memory controller of the computing apparatus, wherein the safe address mapping filter receives a memory cell address and performs address mapping with respect to the enabled memory cells.

In an exemplary embodiment, the method may further include: providing the memory device with safe address mapping information of a basic input/output system (BIOS) based on BIOS setting information for capacities of the safe memory region and the normal memory region of the memory device during a boot process of the computing apparatus; requesting, by a program, activation of the safe address mapping information by calling the BIOS while an operating system (OS) is run; and dividing the memory device into the safe memory region and the normal memory region by activating the safe address mapping information provided to the memory device by the BIOS, where the safe memory region and the normal memory region are separately accessible.

In an exemplary embodiment, a safe address mapping filter implemented with a logic for performing the setting step and the controlling step may be incorporated into a memory management unit of an operating system (OS) program to be run in the computing apparatus; and the method may further include enabling the safe address mapping filter to map a memory cell address requested by hardware of the computing apparatus to an address of the enabled memory cells and return a converted memory cell address to the hardware, wherein the hardware accesses the memory device based on the returned memory cell address.

In an exemplary embodiment, the safe address mapping filter may comprise a logic for, calculating a first remainder by dividing a total number of columns in a cell array of the memory device by k, converting a memory cell address, Addr, to a value calculated by multiplying the memory cell address Addr by k, when said first remainder is not equal to zero, calculating a second remainder by dividing a current row number to be currently accessed by 2, when said first remainder is equal to zero, converting the memory cell address, Addr, to a value of k*Addr−m, when said second remainder is equal to zero, and converting the memory cell address, Addr, to the value calculated by multiplying the memory cell address, Addr, by k when the second remainder is not equal to zero, where k is an inverse of a capacity reduction ratio of the safe memory region and is a natural number greater than 1, and m is a natural number less than the k.

In an exemplary embodiment, a basic input/output system (BIOS) of the computing apparatus includes a safe memory region setting menu; and the method may further include, during a boot process of the computing apparatus, receiving a selected option for setting the safe memory region from the safe memory region setting menu, and storing capacity information of the safe memory region and the normal memory region, and a capacity reduction ratio in the BIOS, based on the selected option.

In an exemplary embodiment, the method may further include updating capacity information of the memory device by providing the memory device with the capacity information of the safe memory region and the normal memory region; and during a reboot process of the computing apparatus, reading updated capacity information of the memory device from the memory device.

In an exemplary embodiment, the method may further include setting the enabled memory cells to the disabled state and the disabled memory cells to the enabled state during a boot process of the computing apparatus.

According to exemplary embodiments of the present inventive concept, there is provided a method of controlling access to a memory device of a computing apparatus. The method includes: setting at least a subset of memory cells of the memory device to a safe memory region and a remainder of the memory cells to a normal memory region; setting a subset of memory cells of the safe memory region to an enabled state and a remainder of the memory cells of the safe memory region to a disabled state; setting all memory cells of the normal memory region to the enabled state; and controlling access to memory cells of the safe memory region so that access to enabled memory cells is allowed and access to disabled memory cells is prevented. The enabled memory cells of the safe memory region are spaced apart from each other by at least one disabled memory cell in a horizontal and/or vertical direction.

In an exemplary embodiment, the controlling step may include: mapping a memory cell address to an address of the enabled memory cell based on a safe address mapping algorithm such that a memory cell address converted by the mapping is used to access memory cells of the safe memory region, when the memory cell address to be accessed belongs to the safe memory region; and using the memory cell address without conversion to a different address to access memory cells of the normal memory region, when the memory cell address to be accessed belongs to the normal memory region.

In an exemplary embodiment, the safe address mapping algorithm may include a logic for, calculating a first remainder by dividing a total number of columns in a cell array of the memory device by k, converting the memory cell address, Addr, to a value calculated by multiplying the memory cell address Addr by k, when said first remainder is not equal to zero, calculating a second remainder by dividing a current row number by 2, when said first remainder is equal to zero, converting the memory cell address, Addr, to a value of k*Addr−m, when said second remainder is equal to zero, and converting the memory cell address, Addr, to the value calculated by multiplying the memory cell address, Addr, by k when the second remainder is not equal to zero. Here, k is an inverse of a capacity reduction ratio of the safe memory region and is a natural number greater than 1, and m is a natural number less than k.

In an exemplary embodiment, a safe address mapping filter implemented based on the safe address mapping algorithm may be incorporated into any one of the memory device and a memory controller of the computing apparatus. The safe address mapping filter may receive a memory cell address to be accessed and perform address mapping with respect to the enabled memory cells.

In an exemplary embodiment, a basic input/output system (BIOS) of the computing apparatus may include a safe memory region setting menu. The method may further include, during a boot process of the computing apparatus, receiving a selected option for setting the safe memory region from the safe memory region setting menu, and storing capacity information of the safe memory region and the normal memory region and a capacity reduction ratio in the BIOS, based on the selected option.

According to exemplary embodiments of the present inventive concept, there is provided a method of controlling access to a memory device of a computing apparatus. The method includes setting at least a subset of memory cells of the memory device to a safe memory region, setting a subset of memory cells of the safe memory region to an enabled state and a remainder of the memory cells of the safe memory region to a disabled state, respectively, wherein access to enabled memory cells is allowed and access to disabled memory cells is prevented, and mapping a memory cell address to an address of an enabled memory cell based on a safe address mapping algorithm wherein a memory cell address converted by the mapping is used to access information from memory cells of the safe memory region, when the memory cell address being accessed belongs to the safe memory region. The enabled memory cells of the safe memory region are spaced apart from each other by at least one disabled memory cell in a horizontal and/or vertical direction.

In an exemplary embodiment, the method may include setting a remainder of the memory cells to a normal memory region, setting all memory cells of the normal memory region to the enabled state, and using the memory cell address without conversion to a different address to access information from memory cells in the normal memory region, when the memory cell address being accessed belongs to the normal memory region.

In an exemplary embodiment, the safe address mapping algorithm may include calculating a first remainder by dividing a total number of columns in a cell array of the memory device by k, converting the memory cell address, Addr, to a value calculated by multiplying the memory cell address Addr by k, when said first remainder is not equal to zero, calculating a second remainder by dividing a row number to be currently accessed by 2, when said first remainder is equal to zero, converting the memory cell address, Addr, to a value of k*Addr−m, when said second remainder is equal to zero, and converting the memory cell address, Addr, to the value calculated by multiplying the memory cell address, Addr, by k when the second remainder is not equal to zero. k is an inverse of a capacity reduction ratio of the safe memory region and is a natural number greater than 1, and m is a natural number less than k.

Embodiments of the present inventive concept can set a gap between adjacent memory cells ('inter-memory cell space') in the desired memory region sufficiently wide to prevent the cell hammer phenomenon from occurring. Thus, a cell hammer phenomenon can be reliably prevented. In addition, embodiments of the present inventive concept can set part or all of the memory cell region to be a safe memory region for which cell hammer prevention measures are taken.

Embodiments of the present inventive concept can allow a user can decide whether or not to use memory safe mode, and whether to set the memory safe region to be wide or narrow, flexibly according to their needs. Embodiments of the present inventive concept can minimize the errors that can occur in running an operating system (OS) program. Such errors often occur due to data loss in a memory region on which the OS program is loaded, and the cell hammer phenomenon may be one of the causes. According to embodiments of the present inventive concept, the user may set at least a partial region of the memory device to be a safe memory region for the OS program. Thus, it is possible to prevent the malfunction of the OS program due to the cell hammer phenomenon. The user may set the entire cell region of the memory device to the safe memory region for mission critical tasks. A safe memory region setting function may be provided as an optional function. During a normal situation, this function may not be used and the entire physical capacity of a memory device may be used in a normal mode.

The cell hammer prevention measures provided by embodiments of the present inventive concept, that is, setting the safe memory region and access control for the region, may be implemented in software, while maintaining the hardware state of the memory device as is. Therefore, embodiments of the present inventive concept will not physically damage the memory cells in a memory device, or degrade hardware performance of the memory device.

The memory capacity is reduced by setting the safe memory region, but the setting of the safe memory region can be turned off in software if necessary. In other words, user can select freely any one of the safe memory mode and the normal memory mode. Through this function, the original capacity of the memory device can be recovered and fully used at any time.

BRIEF DESCRIPTION OF THE DRAWINGS

FIGS. 12A and 12B schematically illustrate a safe address mapping logic for a safe memory region of which capacity is reduced by half, according to an embodiment.

FIGS. 13A through 13C schematically illustrate a safe address mapping logic for a safe memory region of which capacity is reduced to a third, according to an embodiment.

FIGS. 14A through 14C schematically illustrate a safe address mapping logic for a safe memory region of which capacity is reduced to a quarter, according to one embodiment.

DETAILED DESCRIPTION OF EXEMPLARY EMBODIMENTS

Figure 1:
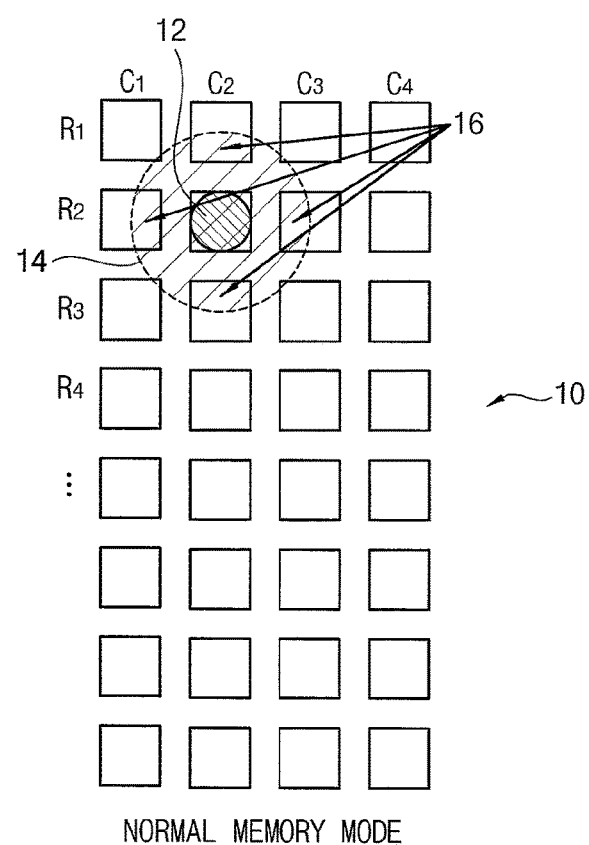
FIG. 1 illustrates a cell hammer phenomenon that may occur in a conventional memory device.

Various embodiments will be described more fully hereinafter with reference to the accompanying drawings, in which some exemplary embodiments are shown. The present inventive concept may, however, be embodied in many different forms and should not be construed as limited to the exemplary embodiments set forth herein. In the drawings, the sizes and relative sizes of layers and regions may be exaggerated for clarity. Like numerals may refer to like elements throughout.

It will be understood that when an element is referred to as being "connected" or "coupled" to another element, it can be directly connected or coupled to the other element or intervening elements may be present.

FIG. 1 conceptually illustrates an occurrence of the cell hammer phenomenon. When a memory cell 12 is written, four memory cells $R_1C_2$, $R_2C_1$, $R_2C_3$, and $R_3C_2$ that are adjacent to the cell 12 in the horizontal and vertical directions may belong to a cell hammer influence zone 14. The cell hammer phenomenon can be triggered by specially crafted memory access patterns that rapidly activate the same memory rows numerous times. This phenomenon was not an issue for older memory models, which have more inter-cell space. However, as memory cells become more highly integrated, the physical size of the memory cell becomes smaller. Thus, an amount of charge to be stored in each cell also becomes smaller, and the inter-cell space also becomes narrower. The operation noise margins of the memory cells accordingly decrease. As a result, electromagnetic interactions between the memory cells may increase, and thus the possibility of data loss may increase. Therefore, the cell hammer phenomenon is an effect which can naturally arise in accordance with the increased integration density of a memory device.

Embodiments of the present disclosure can prevent the cell hammer phenomenon by using only a subset of the memory cells while setting the remaining memory cells to be inaccessible, where the accessible memory cells are spaced apart from each other by at least one cell in the horizontal and vertical directions.

Such memory use may be effected by controlling the memory access address in a memory device by way of software, rather than by physically destroying the non-accessible memory cells or by way of hardware. So, inaccessible memory cells can be used again later by turning off the access prohibition. Whether to set access control may be provided as an option for a user to choose.

A memory device usage according to embodiments of the present disclosure includes the following approaches.

A first approach according to an embodiment uses only a subset of the memory cells, that is, 1/k of the total number of memory cells, where k is the inverse of a memory capacity reduction ratio of a safe memory region, hereinafter referred to as a 'capacity reduction ratio', and is a natural number greater than or equal to 2. However, if k is greater than or equal to 5, memory use efficiency may be too low to be practicable. In this case, an entire memory cell region may be a 'safe memory region'.

A second approach according to an embodiment uses a memory device in a hybrid memory using mode in which in a partial region of the memory device, only a fraction, such as 1/k, of the memory cells within the partial region are accessible, while all memory cells in the remaining region of the memory device are inaccessible. In this case, the partial region is 'a safe memory region' and the remaining region is 'a normal memory region'.

The first approach may degrade the usage efficiency of the memory cells but can use the entire relevant memory cell region in a very stable manner. The second approach can have a higher usage efficiency as compared to the first approach because it applies the first approach to just a subset of the entire memory cell region and uses all the memory cells within the remaining region of the entire memory cell region, however, memory cells within the remaining region may be exposed to the cell hammer phenomenon.

Figure 2A:
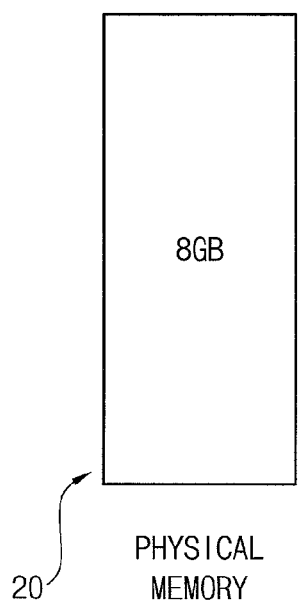
FIGS. 2A to 2C illustrate typical exemplary memory use modes in which a memory cell can be used safe from a cell hammer phenomenon in accordance with an embodiment of the present inventive concept.
Figure 2B:
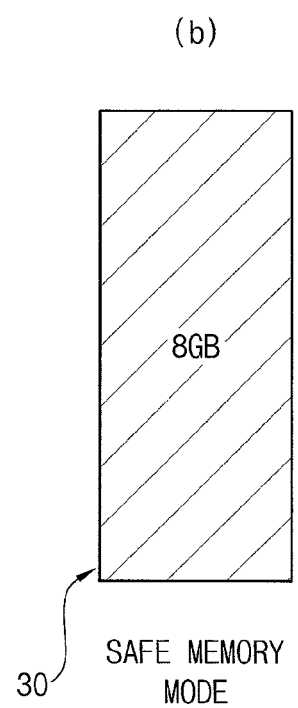
Figure 2C:
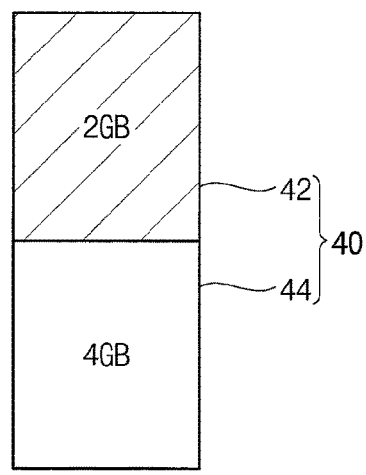

FIGS. 2A through 2C schematically illustrate cases of a physical memory 20 having a capacity of, for example, 8 GB, being used in accordance with a first approach and a second approach.

FIG. 2B illustrates an example according to a first approach. In this example, an entire region of the physical memory 20 of 8 GB capacity is set to be a safe memory region 30 and the capacity reduction ratio (1/k) is set to be 1/2. Thus, only 4 GB is eligible to be used in practice. However, embodiments are not limited to a capacity reduction ratio of 1/2, and other values, such as 1/3, 1/4, or 1/5, may be used as the capacity reduction ratio (1/k).

Figure 3A:
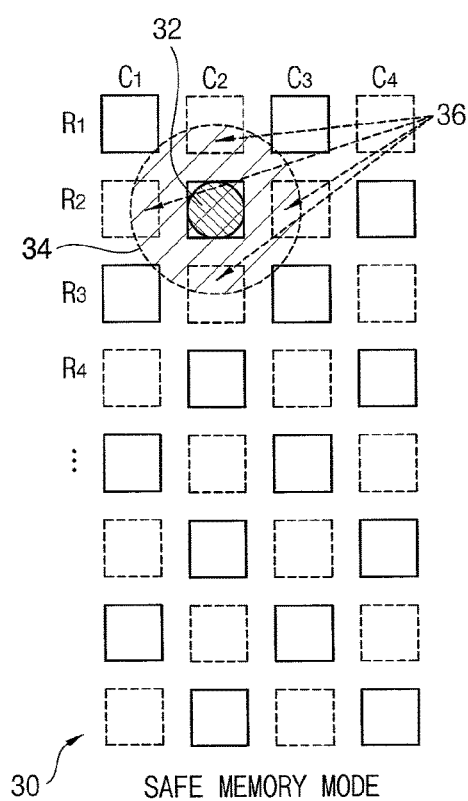
FIGS. 3A and 3B illustrate memory use modes in which an entire or a part of a memory cell region can be used safe from a cell hammer phenomenon, in accordance with an embodiment of the present inventive concept.

Utilization of memory space is decreased in that only 4 GB out of 8 GB is usable, but the full 4 GB of the safe memory region 30 can be a safe region free from the cell hammer phenomenon. In other words, as shown in FIG. 3A, among all the memory cells within the safe memory region 30, only the odd-numbered cells in the odd-numbered rows and even-numbered cells in the even-numbered rows are accessible, that is, in an enabled state, whereas the remaining cells of the safe memory region 30, that is, the even-numbered cells in the odd-numbered rows and the odd-numbered cells in the even-numbered rows are inaccessible, that is, in a disabled state. However, embodiments are not limited to this arrangement, and even-numbered cells in the odd-numbered rows and odd-numbered cells in the even-numbered rows may be in the enabled state, and thus in this case the odd-numbered cells in the odd-numbered rows and even-numbered cells in the even-numbered rows are in the disabled state.

As such, there are 2 GB of memory cells in the enabled state within the safe memory region 30, which are spaced apart from each other by one cell interval in each of the vertical and horizontal directions. When data is recorded in an enabled certain memory cell 32, there may be some disabled memory cells in a range within which the cell hammer phenomenon may occur, but there will be no enabled memory cells in that range. Therefore, it can be said that the 2 GB memory cell region has a very low probability of occurrence of the cell hammer phenomenon.

FIG. 2C illustrates an example of using the physical memory 20 in a second, hybrid mode according to an embodiment, which is a combination of a normal memory mode and a safe memory mode. In a hybrid mode according to an embodiment, an 8 GB physical memory 20 is divided into two half regions, where a first half region 42 having 4 GB capacity is set to a safe memory mode having 2 GB of accessible memory cells, and a second half region 44 having the remaining 4 GB capacity is set to a normal memory mode having all 4 GB of accessible memory cells. In the safe memory mode memory region 42, half of the memory cells, 2 GB, are set to be disabled, and the remaining 2 GB memory cells are set to be enabled. Thus, an 8 GB memory device 20 is used logically as a 6 GB capacity memory device 40.

Figure 3B:
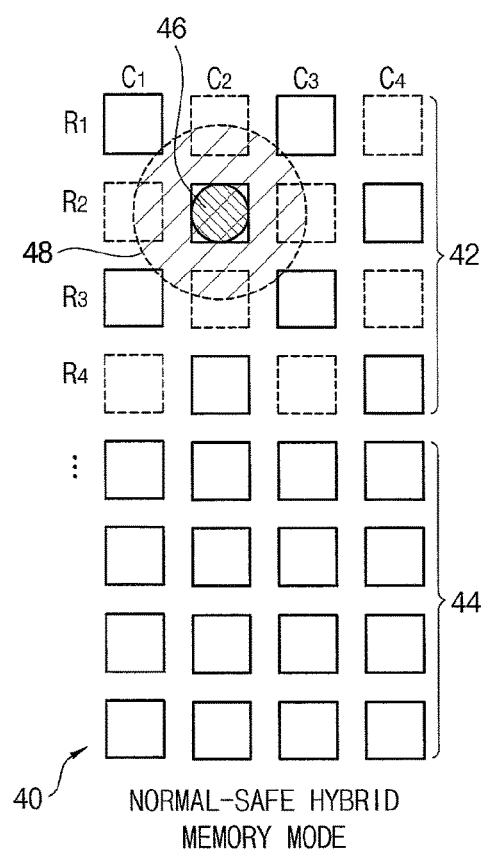

As shown in FIG. 3B, in the safe memory region 42, a disabled memory cell is adjacent to an enabled memory cell 46 in the horizontal and the vertical directions, in other words, within a cell hammer influence zone 48.

The safe memory regions 30 and 42 may be used as a region for performing relatively important tasks. For example, if safe memory regions 30 and 42 are used to load the OS, an OS malfunction can be prevented, which can ensure stable operation of a computer system. In addition, the safe memory regions 30 and 42 can be used when a computing system needs to normally operate without stopping, e.g., a 24-hour surveillance system.

Figure 4:
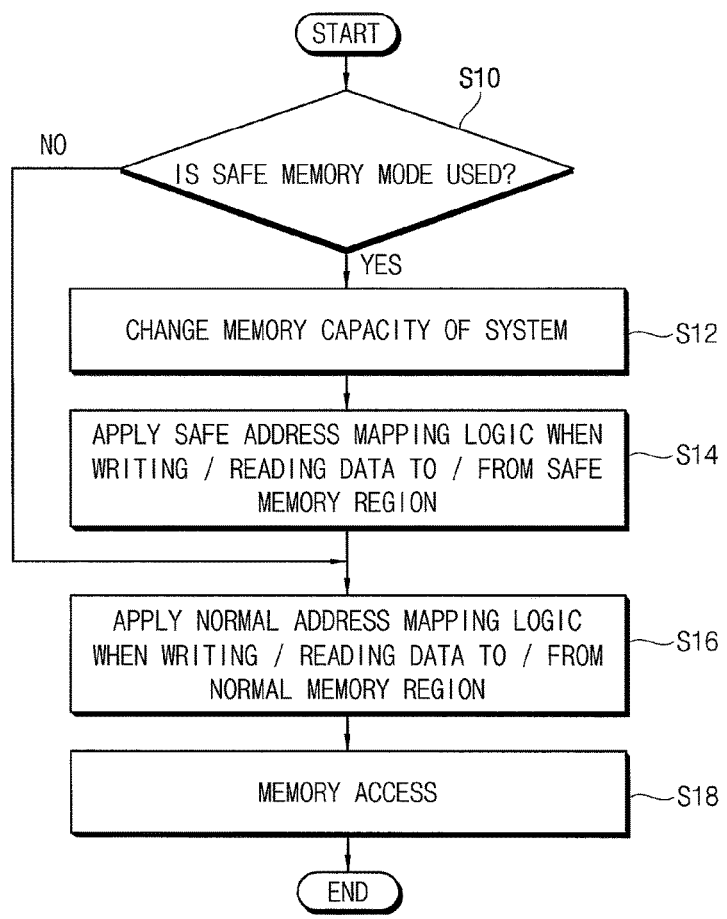
FIG. 4 is a flow chart that schematically illustrates the overall logic of a method of controlling memory access by using safe address mapping in accordance with an embodiment of the disclosure.

FIG. 4 is a flow chart that illustrates a method of controlling memory access according to an embodiment of the present disclosure. The method may include two processes. A first process sets a safe memory region, that is, a region of a memory device to be used in safe memory mode. A second process controls access to the memory cells to prevent a cell hammer phenomenon from occurring by safe address mapping with respect to the safe memory region.

A safe memory region can be set automatically during the boot process of a computing apparatus in accordance with default conditions specified in advance. A user may provide the computing apparatus with instructions for setting the safe memory region in the boot process of a computing apparatus. Alternatively, a safe memory region can set by executing the OS.

A safe memory region can be set by any method which can be performed in software. Referring now to FIG. 4, a method begins by first determining whether the safe memory mode is to be used or whether normal memory mode is to be used (Step S10). If safe memory mode is to be used, the capacity of the memory device will change. The computing apparatus determines the change of memory capacity according to the safe memory mode being used, and stores the relevant information (Step S12). According to an embodiment, the information to be stored includes, for example, the memory capacity to be used as the safe memory region, the capacity reduction ratio (1/k) of the safe memory region, and the address range, i.e., upper and lower limits of the address, of the safe memory region, etc. If there is a region to be used as the normal memory region, the information further includes its address range.

After the capacity of the safe memory region and its capacity reduction ratio (1/k) are determined, it is possible to determine which memory cells should be enabled to be accessible for reading and writing data, and memory cells should be disabled state to be inaccessible (details for this will be described below). In addition, all the memory cells in the normal memory region may be treated as being enabled.

After setting the memory cells' accessibility, memory access for reading and writing data can be controlled on the basis of the settings. That is, safe memory mapping with respect to the safe memory region can be performed such that the disabled memory cells are ignored and only the enabled memory cells are accessible for reading and writing data (Step S14). Safe address mapping is a process that converts input addresses such that the enabled memory cells are separated by at least one disabled memory cell in the horizontal and/or vertical direction. Through this safe address mapping, the safe memory region can be free from the cell hammer phenomenon.

In a normal memory region, memory access can be controlled by any conventional memory address mapping method, that is, memory address mapping can be controlled by a normal address mapping logic that converts the physical address requested by a processor into its corresponding memory address by regarding all memory cells in the region as being enabled (Step S16). Since normal address mapping logic is well-known, further descriptions thereof will be omitted.

According to an embodiment, an address obtained by address mapping as above can be used for operations such as reading data from and/or writing data to the memory device (Step S18). Thus, cell hammer phenomenon can be prevented at least in a safe memory region.

Figure 5:
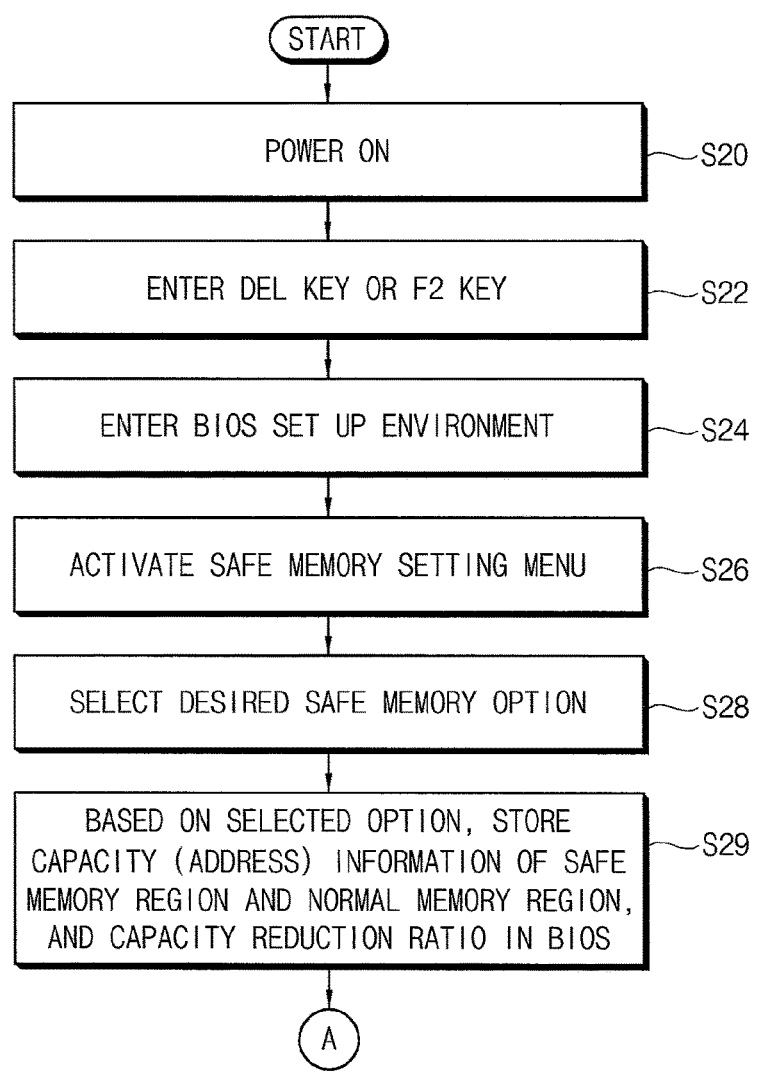
FIG. 5 is a flow chart of a process for setting a safe memory region of a memory device during a booting procedure of a computing apparatus in accordance with an embodiment of the disclosure.

FIG. 5 is a flow chart of a method of setting the safe memory region according to an embodiment of the present disclosure. A method according to an embodiment sets the safe memory region of a memory device during a boot process of a computing apparatus. To this end, a function capable of setting the safe memory region can be added to a BIOS of the computing apparatus.

Specifically, according to an embodiment, when power is turned ON (step S20) in a computing apparatus such as a personal computer, the BIOS startup code is executed and the boot process will be initiated. When a user presses the DEL key or F2 key input during the boot process (step S22), the user can enter the BIOS setup environment (step S24).

Figure 8:
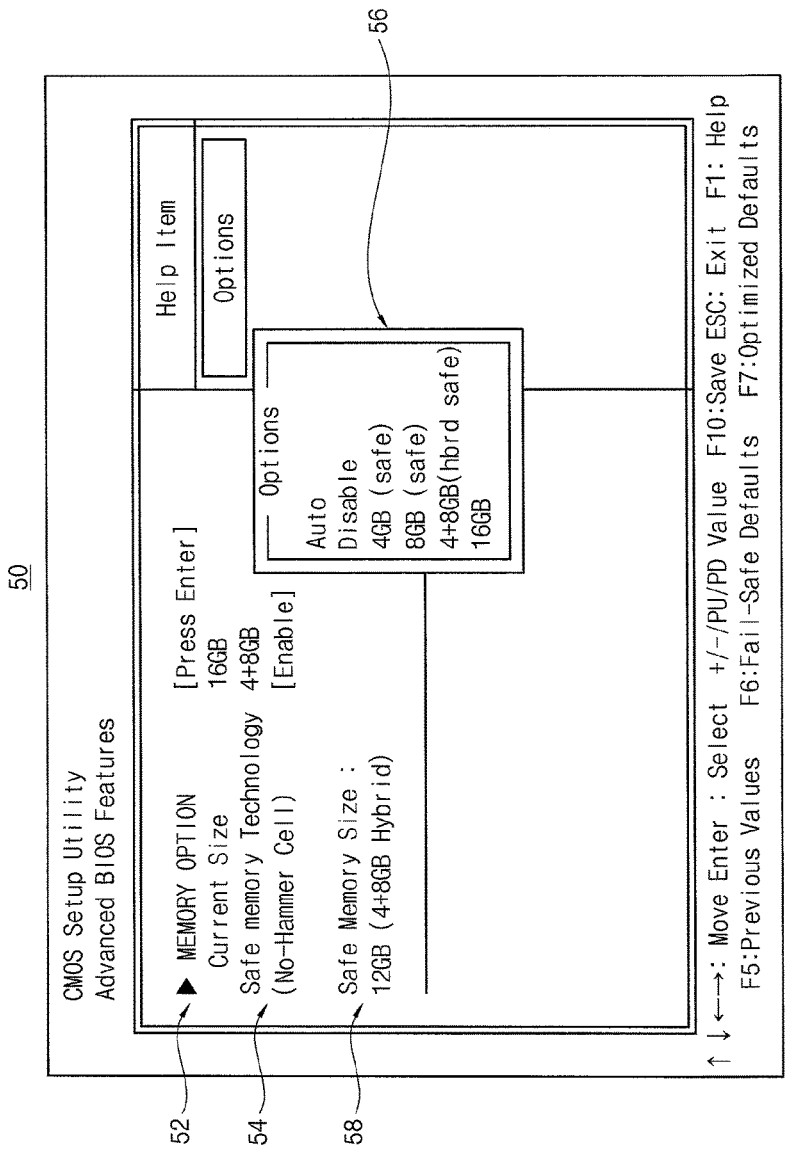
FIG. 8 illustrates a user interface screen for setting a safe memory region in the BIOS (basic input/output system) when booting a computing apparatus in accordance with an embodiment of the present inventive concept.

A BIOS according to an embodiment of the present disclosure has an ability to establish the safe memory region. By this ability, a memory option screen 50 for setting a safe memory region can be displayed as illustrated in FIG. 8. In memory option screen 50, if the user positions the cursor on the memory option menu 52 and then presses the enter key, the current size (for example, 16 GB) of the physical memory of the computing apparatus is displayed. In addition, the safe memory settings menu 54 is activated (step S26). When the safe memory settings menu 54 is activated, an option window 56 for setting the safe memory region opens up.

According to an embodiment, the option window 56 provides the following options: (i) Auto: This an option automatically sets the default safe memory region, (ii) Disable: This option disables the 'Auto' option so that the safe memory region can be set manually, (iii) 4 GB (safe): This option sets a safe memory region of the total 16 GB memory capacity to be 4 GB, (iv) 8 GB (safe): This option sets a safe memory region of the total 16 GB memory capacity to be 8 GB, (v) 4+8 GB (hbrd safe): This option sets a safe memory region of half, 8 GB, of the total 16 GB memory capacity to be 4 GB, and at the same time sets the other half, 8 GB, to be a normal memory region, and (vi) 16 GB: This option sets the entire 16 GB memory capacity to be a normal memory region, without setting a safe memory region.

The user can select a desired safe memory option from these options (step S28). The memory capacity that can be validly accessed varies depending on the selected option. According to an embodiment, the memory size 58 corresponding to the selected option is displayed. In the figure, the safe memory size 58 displayed is 12 GB (4+8 GB) because the user selected the option '4+8 GB (hbrd safe)' from the option window 56.

After selecting the safe memory option, information, including the sizes of the safe memory region and the normal memory region, i.e. a start address and an end address of each of these regions, and the capacity reduction ratio (1/k), is determined accordingly. The information is stored in the BIOS (Step S29), and the capacity reduction ratio (1/k) is provided in a separate process, such as by a separate user input. A method of FIG. 5 may continue with a process to record a changed memory capacity as illustrated by either FIG. 6 or FIG. 7.

If at least a partial region of the whole cell region of the memory device is set to be the safe memory region, the physical size of the memory device will not change, but the actual effective usable capacity of the memory device will change. Changing safe memory options for the safe memory region may also change the effective memory size. If the capacity and the capacity reduction ratio (1/k) of the safe memory region is determined, the number of memory cells to be disabled can be calculated. By subtracting the number of memory cells to be disabled state from the total capacity of the memory device, the effective accessible memory capacity can be calculated. The memory capacity calculated in this way is the effective accessible total capacity of the memory device. In addition, the safe memory capacity and the normal memory capacity can be calculated. The start address and the end address of each of the safe memory region and the normal memory region can also be determined.

Figure 6:
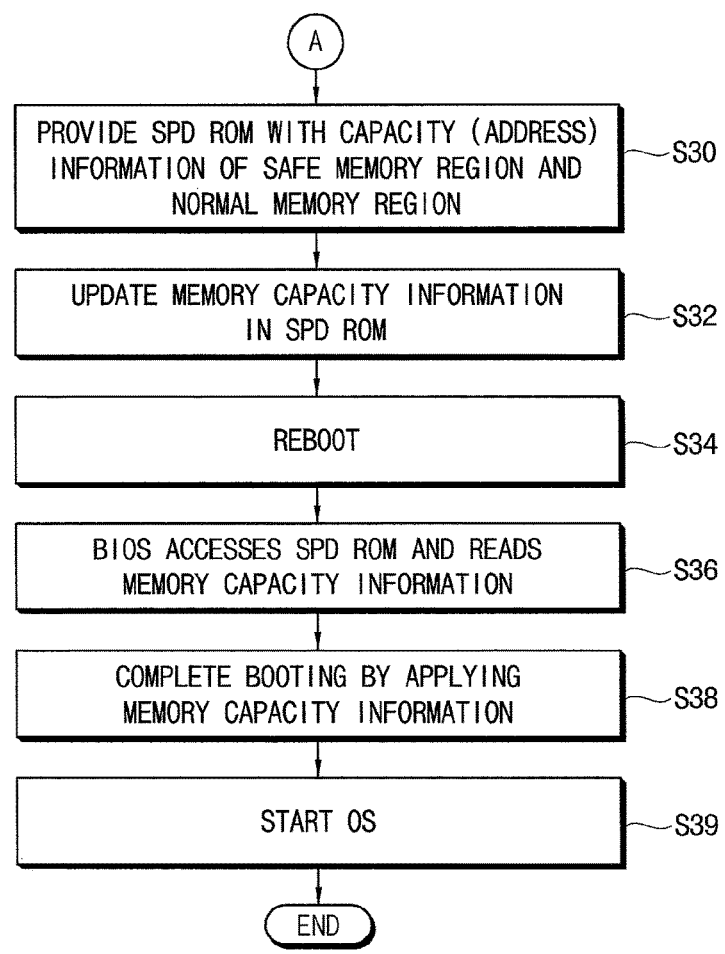
FIG. 6 is a flow chart of a process that records a memory capacity changed by setting a safe memory region during a boot procedure of a computing apparatus in accordance with an embodiment of the disclosure.

According to an embodiment, the change in the memory capacity is recorded so that a system processor can recognize the changed memory capacity. A method for this changes the memory size information in a memory information repository of the memory device. If the memory device is, for example, a dual in-line memory module (DIMM), the memory information repository may be, for example, a serial presence detect (SPD). For example, 72-pin single in-line memory modules (SIMMs), or older memory devices, store the memory information in a parallel presence detector (PPD). FIG. 6 illustrates a process to record the change in memory capacity due to the setting of a safe memory region during the boot process of a computing apparatus, according to a first method according to an embodiment. FIG. 6 will be described with respect to a memory device, such as a synchronous dynamic random-access memory (SDRAM), having an SPD ROM.

Most computing apparatuses perform a power-on self-test when power is turned on to automatically configure the hardware currently present. For example, an SDRAM stores the memory capacity information as a part of the SPD information, which may include information about hardware characteristics such as various operation parameters, in an SPD EEPROM. The SPD information is provided as the initialization information to a system processor when power of the computing apparatus is turned on, and is used to recognize a configuration type of the memory module currently present on the computing apparatus for its normal operations. That is, the computing apparatus may configure the memory device for best performance using the information stored on the SPD EEPROM, such as capacity, data width, speed and voltage of the memory module.

Referring now to FIG. 6, during a boot process of a computing apparatus, when information, such as the capacities (addresses) of the safe memory region and the normal memory region, and the capacity reduction ratio (1/k) are determined, the BIOS provides the information to the SPD ROM (step S30). The existing memory capacity information stored in the SPD ROM is updated with the newly provided memory capacity information (step S32).

Then, when the computing apparatus is rebooted (step S34), the BIOS reads SPD information by accessing the SPD ROM (step S36). In addition, the best performance attributes of the memory device can be configured on the basis of the SPD information. The rebooting process applies information updated in step S32, such as the capacities (addresses) of the safe memory region and the normal memory region and the capacity reduction ratio (1/k), etc. When the rebooting is completed and the OS is executed (step S39), the OS can recognize the capacities (addresses) of the safe memory region and the normal memory region, and the capacity reduction ratio, etc. of the memory device, from the SPD information.

Figure 7:
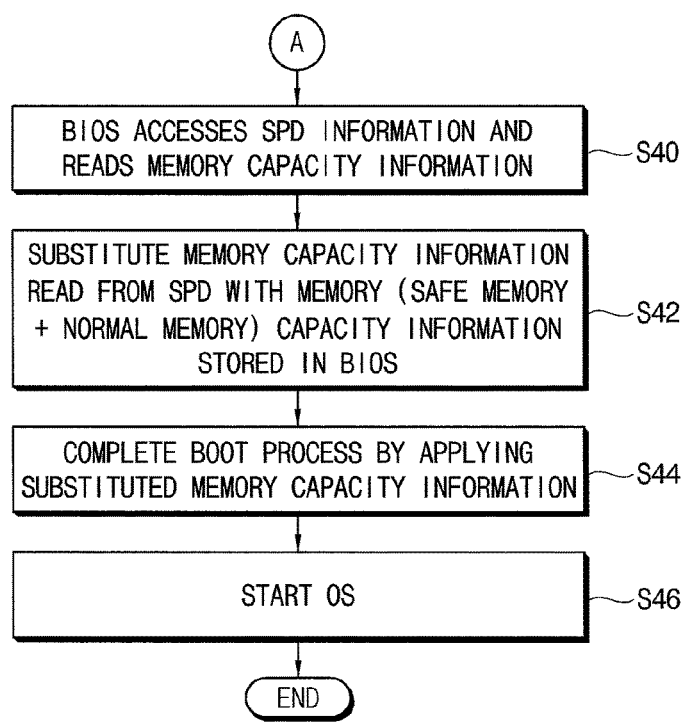
FIG. 7 is a flow chart of another process that records a memory capacity changed by setting a safe memory region during a boot procedure of a computing apparatus in accordance with an embodiment of the disclosure.

According to embodiments, an alternative method to record a memory device capacity change is to change the memory capacity information in the BIOS and ignores the memory capacity information stored in the memory information repository during the next boot process, while keeping the information in the memory information repository as is. FIG. 7 illustrates a process according to this method.

When performing step S29 of FIG. 5, the BIOS stores the capacity (address) information of the safe memory region and/or the normal memory region, and the capacity reduction information, etc. When the computing apparatus goes through the boot process again, the BIOS accesses the SPD ROM as part of the usual boot procedure to read the SPD information, including the memory capacity information (step S40).

Consider a case in which, after the safe memory region and/or the normal memory region information, including the capacity reduction ratio, have been defined through the process of FIG. 5, the information is not recorded to the SPD ROM. In that case, the SPD information read from the SPD ROM by the BIOS is old information and thus should be ignored. In this case, the memory capacity information read from the SPD ROM is substituted with the capacity information of the safe memory region and/or the normal memory region stored in the BIOS (step S42). Therefore, the former information can be ignored, and the latter information can be effectively applied to complete the boot process (step S44). When starting the OS after the boot process (step S46), the computing apparatus will recognize the memory capacity information stored in the BIOS.

On the other hand, to use at least a portion of the memory device in the safe memory mode, in addition to recording the changed memory capacity corresponding to the mode, controlling memory cell access is needed to prevent the cell hammer phenomenon. According to embodiment, there are several ways to control memory cell access. These will be described below.

Figure 9:
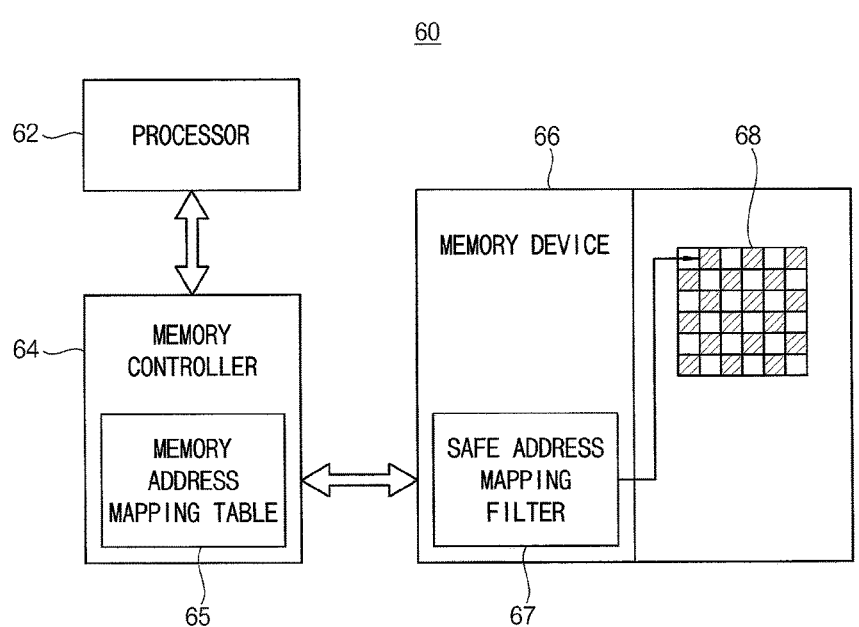
FIG. 9 is a block diagram of a system for performing a method according to an embodiment of the present inventive concept for controlling access to a safe memory region of a memory device by using an address mapping filter incorporated in the memory device.
Figure 10:
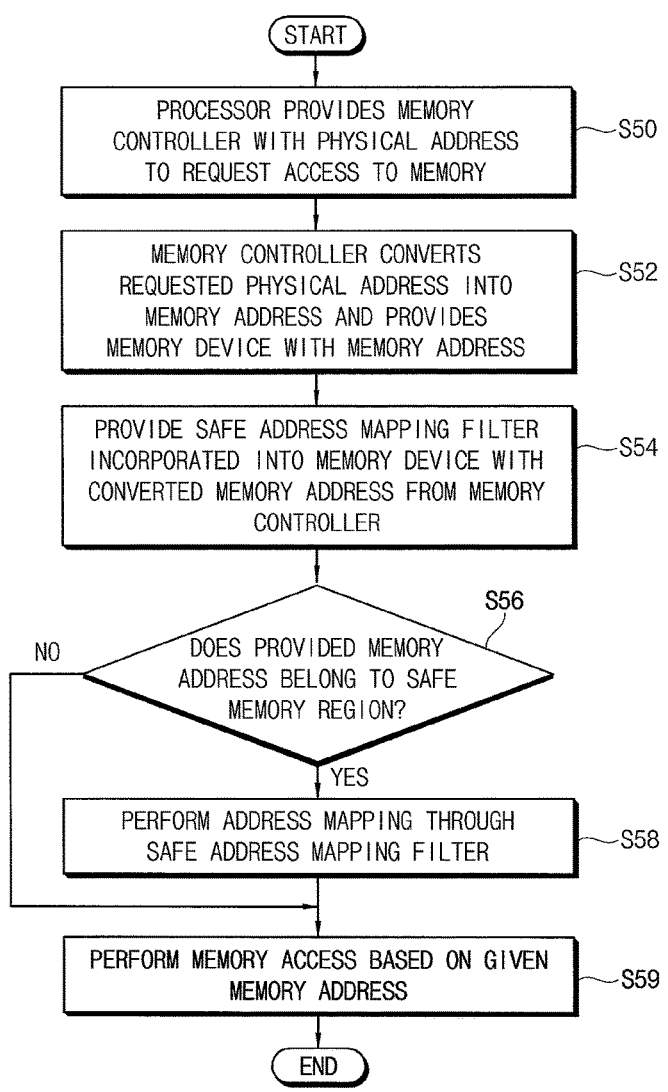
FIG. 10 is a flow chart of an algorithm of a safe address mapping filter used by a method of FIG. 9.
Figure 11:
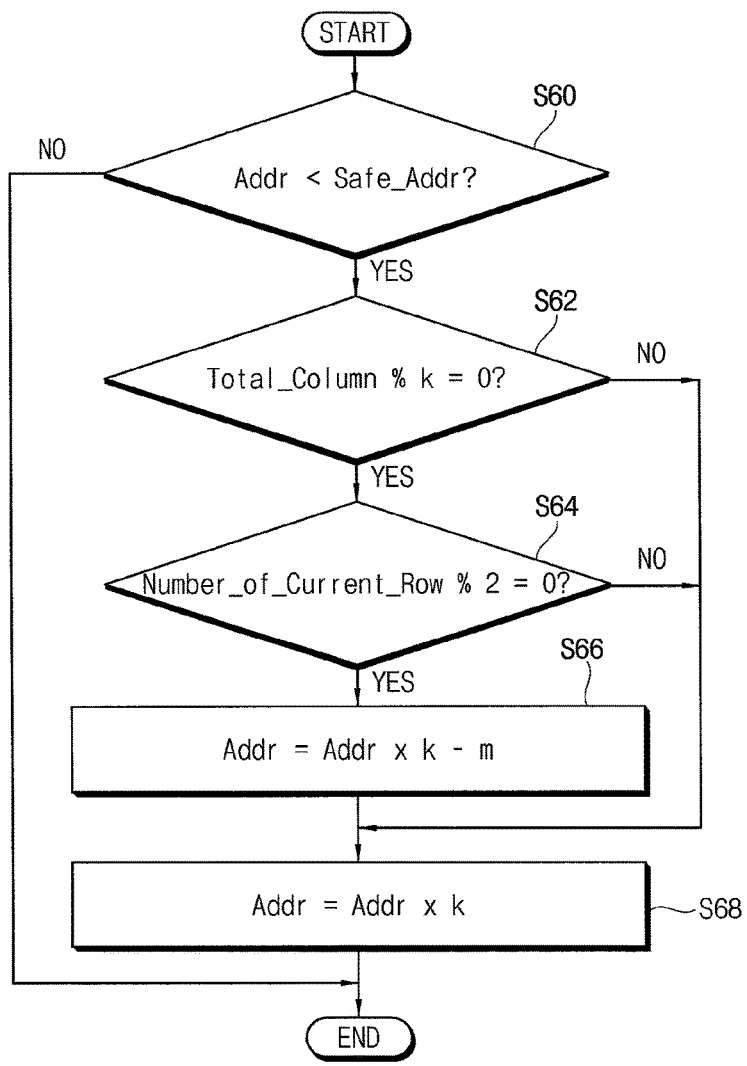
FIG. 11 is a flowchart of an address mapping process with respect to a safe memory region using a safe address mapping filter of FIG. 9.

FIGS. 9 through 14C illustrate methods of controlling memory cell access according to an exemplary embodiment of the present disclosure. FIG. 9 is a block diagram of a system for performing an access control method, and in FIG. 10 is a flow chart of a safe address mapping algorithm used by an access control method of FIG. 9. FIG. 11 is a flowchart of an address mapping process with respect to a safe memory region using a safe address mapping filter of FIG. 9. FIGS. 12A to 12B, 13A to 13C, and 14A to 14C schematically illustrate safe address mapping methods for the safe memory regions having capacity reduction ratios (1/k) of 1/2, 1/3, and 1/4, respectively.

An access control method of FIG. 9 incorporates a safe address mapping filter 67 in a memory device 66 and maps the memory address provided by a memory controller 64 to the address of an enabled memory cell 68 through the mapping filter 67. According to an embodiment, the safe address mapping filter 67 includes capacity information of the safe memory region and/or the normal memory region, the capacity reduction ratio, etc., for example, received from an OS process, and performs address mapping based on the information.

More specifically, referring now to FIGS. 9 and 10, a processor 62 of a computing apparatus 60 provides the memory controller 64 with a physical address to request access to the memory device 66 (step S50). The memory controller 64 maps the physical address to the memory address in a conventional manner using a memory address mapping table 65 and provides the mapped memory address to the memory device 66 (step S52). The memory address may be transmitted to the safe address mapping filter 67 incorporated into the memory device 66 (step S54). The safe address mapping filter 67 determines whether the received memory address belongs to the safe memory region (step S56), and if so, performs address mapping based on a safe address mapping algorithm according to an embodiment (step S58). In other words, the memory cell address is mapped only to addresses of the enabled memory cells. The memory address generated through the mapping is used to access the memory cells in the safe memory region (step S59). If it is determined at step S56 that the received memory address does not belong to the safe memory region, step S58 is skipped and the memory address received from the memory controller 64 is used as is, without being converted into a different address, to access memory cells within the normal memory region (step S59).

The address mapping steps (steps S56 and S58) with respect to the safe memory region using the safe address mapping filter 67 will be further specifically described with reference to the flow chart shown in FIG. 11. According to a safe address mapping algorithm according to an embodiment as shown in FIG. 11, if a first remainder obtained by dividing the total number of columns in the cell array 68 of the memory device 66 by the inverse capacity reduction ratio, k, is equal to zero, and a second remainder obtained by dividing a current row (column) number by 2 is equal to zero, then the memory cell address (Addr) is mapped to a value obtained by subtracting a value in from a value 'k×Addr' obtained by multiplying the memory cell address (Addr) by k. Otherwise, that is, if the first remainder is not zero, or if the second remainder is not zero, the memory cell address (Addr) is mapped to the value of 'k×Addr'.

A mapping process according to an embodiment will be described in more detail with reference to FIGS. 12A through 14C. In these drawings, the memory cells marked by the number '1' are the accessible enabled cells, whereas the remaining memory cells indicated by the blank square boxes represent the inaccessible disabled cells. Referring now to FIG. 11, a first step checks whether the memory address (Addr) received from the memory controller 64 belongs to the address range (Safe_Addr) of the safe memory region (step S60). For example, it can be determined whether the memory address (Addr) is between the start address (e.g.: Safe_Addr=0000:0000) of the safe memory region and the end address (e.g.: Safe_Addr=0010:0000). If the memory address (Addr) does not belong to the range, the memory address (Addr) belongs to the normal memory region, and thus there is no need to perform a safe address mapping process according to an embodiment as shown in FIG. 11.

If, at step S60, it is determined that the memory address (Addr) belongs to the safe memory region, a next step checks whether the first remainder obtained by dividing the total number of columns in the memory cell array 68 of the memory device 66, i.e., the number of memory cells per row, by the inverse capacity reduction ratio k, of the safe memory region, is equal to zero (step S62).

If the first remainder is not equal to zero, if only multiples-of-k numbered memory cells in the safe memory region are set to be accessible enabled memory cells in an ascending address order, the enabled memory cells are separated in the horizontal and/or the vertical direction by at least one disabled memory cell and due to such separation the cell hammer phenomenon can be prevented (refer to FIGS. 12A, 13B, 13C, 14B and 14C). Therefore, in this case the memory address (Addr) can be substituted with the address calculated from 'Addr=k×Addr' (step S68).

Figures 13A, 13B:
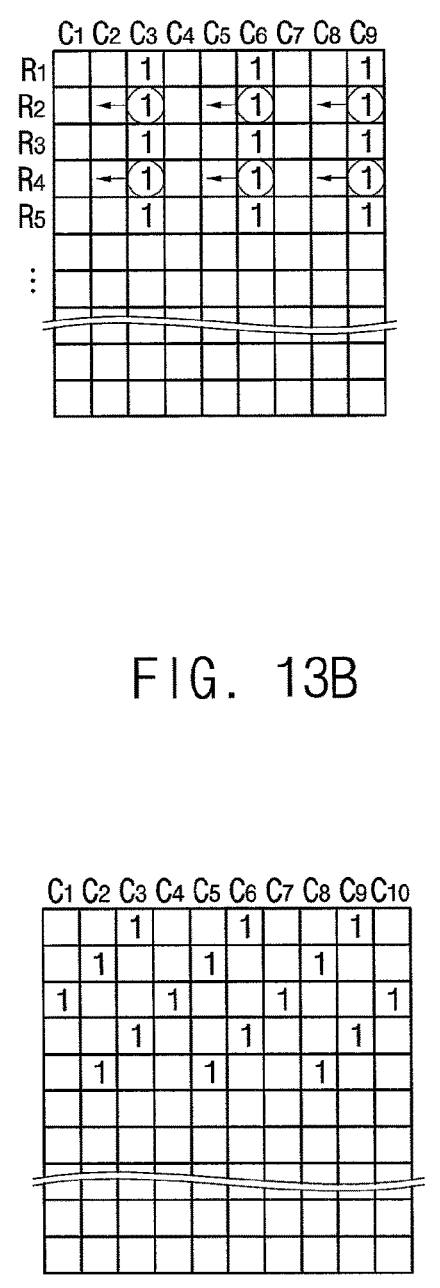
Figures 13C, 14A:
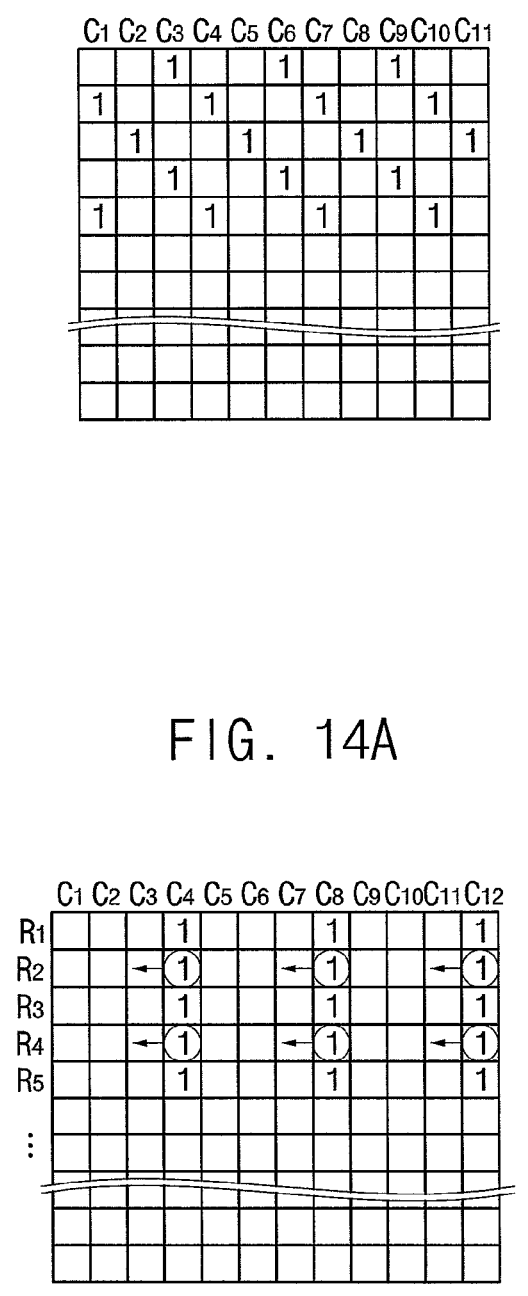

Alternatively, if the first remainder is 0 (FIGS. 12A, 13B, and 14A correspond to this case), then it is checked whether the number of the current row to be accessed is an even number. In other words, it is further checked whether the second remainder obtained by dividing the number of the current row to be accessed by 2 is equal to zero (step S64). At step S64, if the remainder is equal to zero, that is, the current row to be accessed is an even-numbered row, if just the multiples-of-k numbered memory cells within the safe memory region are set to be accessible enabled memory cells in ascending address order, as illustrated in FIGS. 12A, 13A, and 14A, the enabled memory cells are spaced apart from each other in the horizontal direction by at least one memory cell section, but are disposed side by side with no intervening memory cell section in the vertical direction, and thus may be exposed to a risk of the cell hammer phenomenon. Therefore, in that case, cell addresses of the cells in the even-numbered rows should be moved to the left or right by one or more columns as shown by the arrow in FIGS. 12A, 12B, 13A to 13C, and 14A to 14C. This can be achieved by substituting the memory address (Addr) with the address calculated from 'Addr=Addr×k−m' (step S66). This enables all of the memory cells in the safe memory region to be spaced apart from each other vertically and horizontally by at least one memory cell section.

Further, if the second remainder calculated at step 64 is not zero, the memory address (Addr) is substituted with an address calculated from 'Addr=Addr×k' (step S68). If just the multiples-of-k numbered memory cells within the safe memory region are set to be accessible enabled memory cells in ascending address order, the enabled memory cells are separated in the horizontal and/or vertical direction by at least one intervening disabled memory cell between each pair of adjacent enabled memory cells, and thus the cell hammer phenomenon can be prevented (refer to FIGS. 12B, 13B, 13C, 14B and 14C).

Here, k is a natural number greater than 1, and m is any natural number(s) less than k. For example, when k=3, m may be 1, and also be 2. When k=4, m may be 1, 2, or 3.

The safe address mapping filter 67 can be implemented by software having the logic as illustrated in FIG. 11. The steps of FIG. 11 may be coded by a programming language as follows:

<Safe address mapping algorithm>

```
If (Addr < Safe_Addr)
{
    If (Total_Column % k) = 0)
    {
        If (Number_of_Current_Row % 2 = 0)
        {
            Addr = Addr * k - m
        }
        else
        {
            Addr = Addr * k
        }
    }
    else
    {
        Addr = Addr * k
    }
}
```

Figure 15:
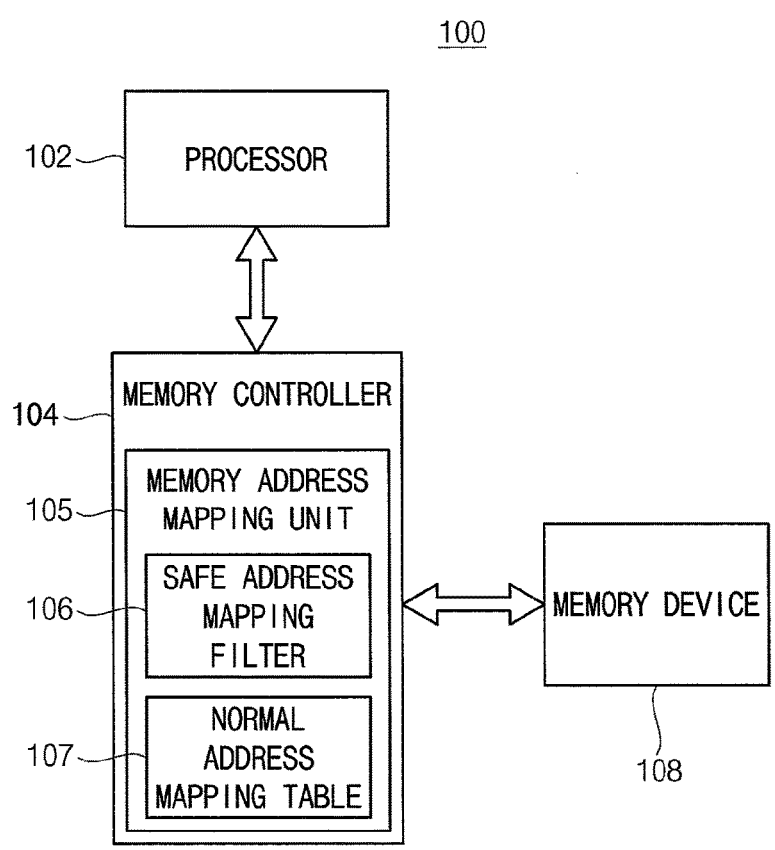
FIG. 15 is a block diagram of an apparatus according to an embodiment of the present inventive concept for performing a method of controlling access to a safe memory region of a memory device by using a safe address mapping filter built in a memory controller.

FIG. 15 is a block diagram of an exemplary configuration of an apparatus 100 for performing a another embodiment of a memory cell access control method according to an embodiment of the disclosure. A present access control method uses a safe address mapping filter 106 incorporated into a memory address mapping unit 105 of a memory controller 104. An algorithm of the safe address mapping filter 106 is substantially the same as that of FIG. 11. A present access control method according to an embodiment of the disclosure differs from an access control method of FIG. 9 in that the safe address mapping filter is incorporated not the memory device 108 but the memory controller 108.

According to an embodiment, memory address mapping unit 105 of the memory controller 104 determines whether the physical address indicated by a processor 102 belongs to the safe memory region. If it is determined that the physical address belongs to the safe memory region, the memory controller 104 performs address mapping through the safe address mapping filter 106, and the memory device 108 accesses the enabled memory cells in the safe memory region using the memory address obtained from the address mapping. Here, as methods according to embodiments of accessing the safe memory region through the safe address mapping filter 106 have been described above, a repeated detailed description will be omitted. If the physical address belongs to the normal address region, the memory controller accesses the memory device using the memory address determined from a conventional normal address mapping table 107.

Figure 16:
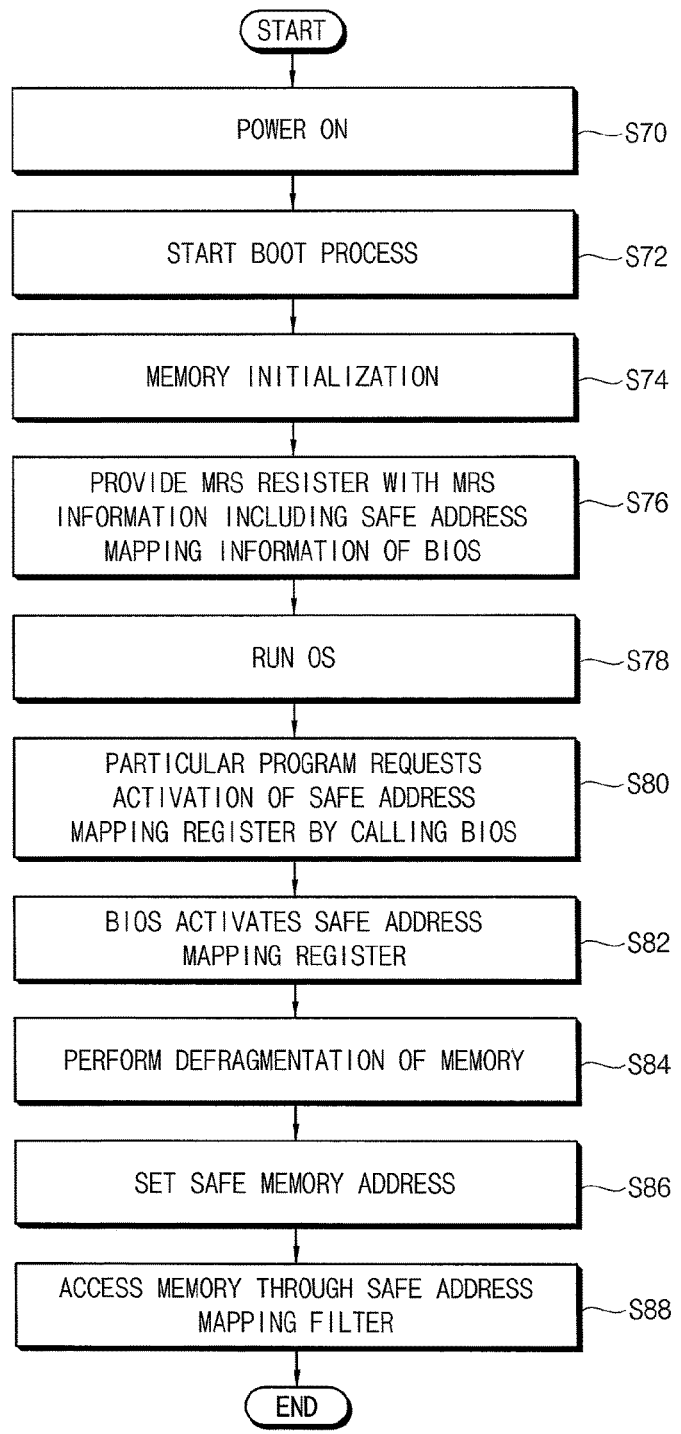
FIG. 16 is a flow chart of a method according to an embodiment of the present inventive concept of setting a safe memory region of a memory device and access to the region by using safe address mapping information of a memory range selector (MRS).
Figure 17:
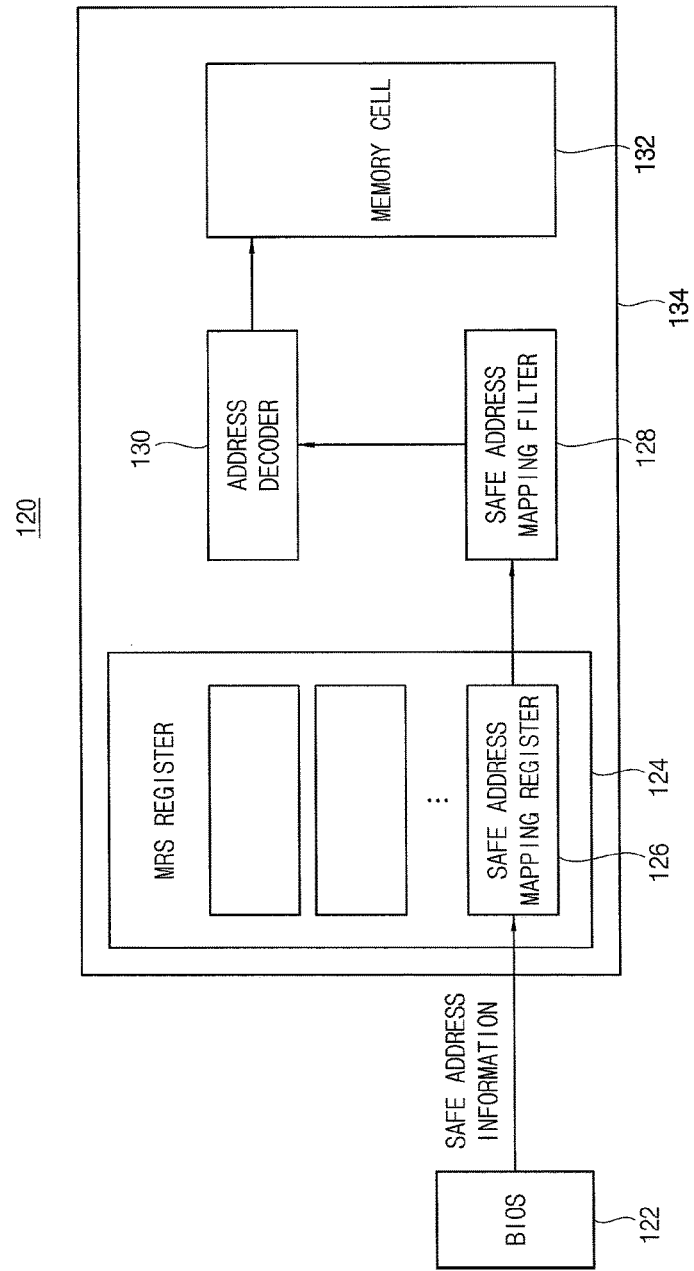
FIG. 17 is a block diagram of an apparatus for performing a method of FIG. 16.

FIGS. 16 and 17 illustrate a method and apparatus for memory cell access control, respectively, according to another embodiment of the disclosure. An access control method according to another embodiment controls setting of a safe memory region of a memory device 134 and accessing the region by using safe address mapping information of a memory range selector (MRS) register 124.

An access control method according to another embodiment assumes that capacities of the safe memory region and the normal memory region with respect to the entire memory cell region 132 of the memory device 134 have been set in advance, and thus the BIOS 122 has access to the setting information. In addition, the setting information of the safe memory region and/or the normal memory region is accessible through the MRS resister unit 124, which can store characteristic information of the memory device 134. Access control to each of the safe memory region and/or the normal memory region may be performed by using a safe address mapping filter 128. The safe address mapping filter 128 may be based on substantially a same algorithm as that of the safe address mapping filter 67 previously described with respect to an access control method of FIG. 9.

Referring now to FIG. 16, a boot process is started by turning on the power of a computing apparatus 120 (steps S70, and S72), and the entire memory cell region 132 of the memory device 34 is initialized (step S74). According to an embodiment, a variety of information recorded in several registers of the MRS register unit 124 is initialized. As the BIOS 122 has access to the capacity settings information of the safe memory region and the normal memory region of the memory cell 132 (see step S29), the BIOS 122 provides the MRS register 124 with the MRS information (step S76), including the safe address mapping information, based on the settings information. The safe address mapping information can be stored in a safe adder mapping register 126. Once the boot process is completed, the OS can be executed (step 78). In this state, the safe address mapping information can be stored in the safe address mapping register 126, but may not be utilized. That is, the safe address mapping register can by default be maintained in a disabled state so long as it does not receive any enablement request.

Once the OS program of the computing apparatus 120 has been started, the entire region of the memory device 134 can be used in normal mode. In this situation, there may be a need for using a partial or entire region of the memory device 134 as a safe address region by converting the former to the latter. In that case, the safe address mapping information stored in the safe address mapping register 126 can be enabled by software.

In detail, the BIOS 122 may be called by a program to request activation of the safe address mapping information. The activation request can be transmitted to the BIOS 122 via the OS (step S80). In response to the activation request, the BIOS 122 sends a request to enable the safe address mapping register 126 (step S82).

When the safe address mapping register 126 is enabled, the safe address mapping information stored in the safe address mapping register 126 can be utilized. According to embodiments, the safe address mapping information includes, but is not limited to, the memory capacity information (start address and end address) to be used in safe memory mode, the capacity reduction ratio, etc. Based on that information, the safe memory region and the normal memory region can be set with respect to the cell region of the memory device 134 (step S86). This setting of the safe memory region and the normal memory region may be performed in accordance with any one of the several region setting methods according to embodiments described above.

In addition, the safe address mapping information is provided to the safe address mapping filter 128. The safe address mapping filter 128 is also enabled and maps the physical address to the memory address based on a safe address mapping algorithm of FIG. 10 (step S88).

Through processes according to embodiments of the disclosure, access to the memory device 134 can be separately controlled with respect to the safe memory region and the normal memory region by activating safe address mapping information stored in the safe address mapping register 126 by software.

In addition, it can be assumed that the entire region of the memory device 134 is used as the normal memory region until the safe address mapping information is enabled. In normal memory mode, data can be recorded so as to be evenly distributed throughout the memory area, regardless of the importance. On the other hand, the safe memory region is used to ensure that important data are recorded only in the safe memory region. To this end, defragmentation for the memory cell 132 is carried out (step S84). Defragmentation is performed prior to setting the safe memory region and the normal memory region (step S86), and can assemble data already recorded in the memory cell 132 into a specific region.

Figure 18:
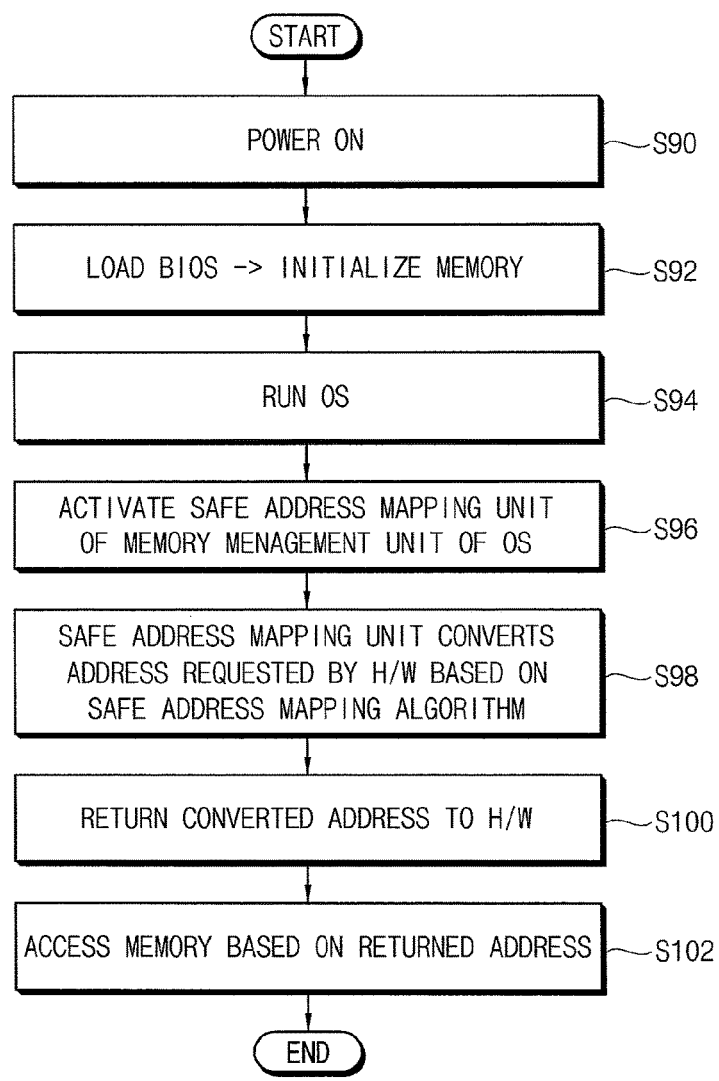
FIG. 18 is a flow chart of a method according to an embodiment of the present inventive concept for setting a safe memory region of a memory device and controlling access to the region by providing a memory management unit of an operating system with a safe address mapping function.
Figure 19:
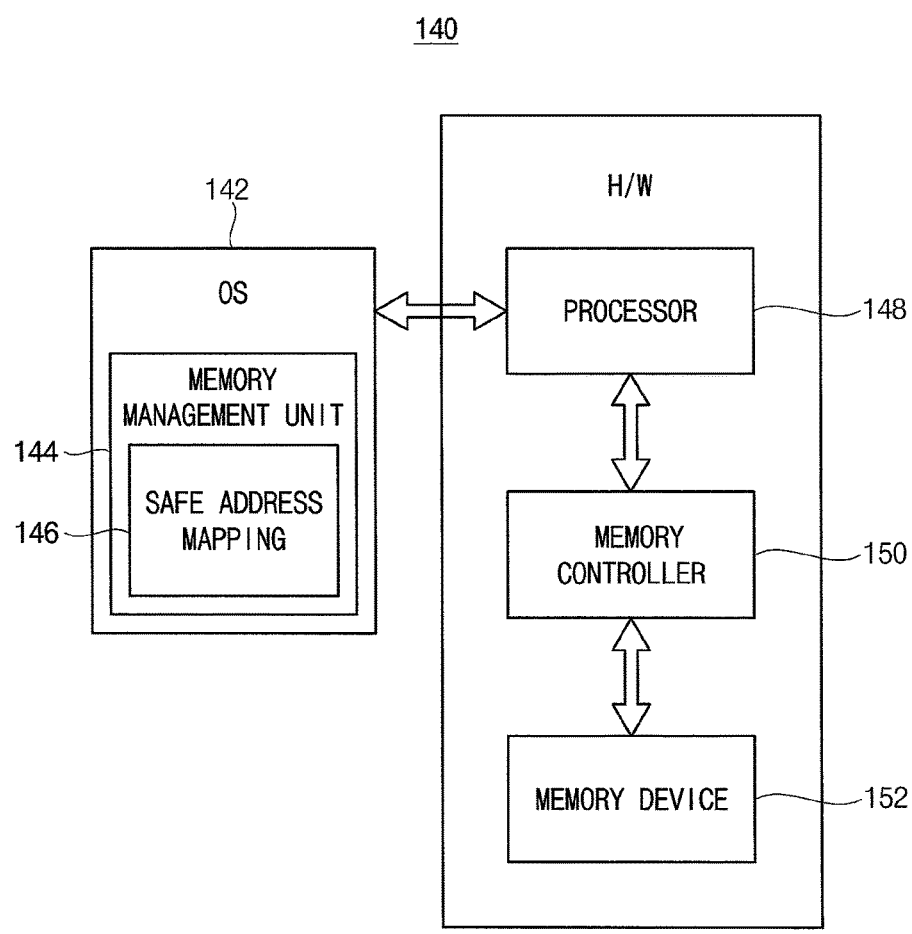
FIG. 19 is a block diagram of an apparatus for performing a method of FIG. 18.

Another embodiment of a memory cell access control method will be described with reference to FIGS. 18 and 19. FIG. 18 is a flow chart that schematically illustrates a method, and FIG. 19 is a block diagram of an apparatus for performing the method of FIG. 18.

A memory cell access control method according to another embodiment of the disclosure uses a memory management unit 144 of the OS 142 of a computing apparatus 140 with a safe address mapping function, which controls setting a safe memory region of a memory device 152 and accessing the region.

When power of the computing apparatus 140 is turned on, the BIOS is loaded and a conventional boot process begins, and memory device 152 can be initialized (steps S90 and S92). After the boot process is completed, the OS 142 starts (step S94), and at that time the memory management unit 144 of the OS 142 can also be run.

According to an embodiment, the memory management unit 144 includes a safe address mapping unit 146 implemented in accordance with the present disclosure. The safe address mapping unit 146 includes a function for setting a partial or entire region of all the cells of the memory device 152 to the safe memory region, and an access control function for preventing the cell hammer phenomenon in the safe memory region. The safe address mapping unit 146 may be automatically enabled when the OS starts, or may be enabled by a user's request (step S96).

When the safe address mapping unit 146 is enabled, the safe memory region can be set in the memory device 152. For example, according to an embodiment, the safe address mapping unit 146, similar to the user interface in the BIOS, displays a user interface screen that is substantially the same as or similar to that of FIG. 8 and guides a user to enter safe memory mode settings. Furthermore, the safe address mapping unit 146 stores the user's settings for the safe memory region in a data repository. The data repository may include, for example, a separate programmable ROM or a non-volatile data storage.

An address requested by hardware H/W of the computing apparatus 140 is transmitted to the safe address mapping unit 146 of the memory management unit 144. According to an embodiment, the hardware H/W includes a processor 148, and a memory controller 150. Mapping the requested memory address to an address of the safe memory region can be carried out according to a safe address mapping algorithm previously described in FIG. 10. Thus, a requested address can be converted into the safe address of the safe address region (step S98). The safe address mapping unit 146 returns the converted address to the hardware H/W that requested the address (step S100). The hardware can access the memory device 152 using the returned memory address (step S102). According to an embodiment, the memory address returned to the hardware is mapped to the address of the enabled memory cells in the safe memory region.

Several exemplary embodiments in accordance with the present disclosure have been described above. According to a present disclosure, a desired capacity of a cell region of a memory device can be designated as a safe memory region, and access to the region can be controlled such that just a subset of the memory cells in the safe memory region are accessible for data writing/reading. The accessible memory cells in the safe memory region are spaced apart from each other by at least one cell section in the horizontal and the vertical directions, without being disposed side by side with each other in each direction. Therefore, data loss or contamination due to the cell hammer phenomenon between these cells can be prevented.

In addition, exemplary embodiments of the present disclosure can set the enabled memory cells and the disabled memory cells in the safe memory region during the boot process of the computing apparatus, which can maintain the reliability of the memory device.

In addition, the capacity of the safe memory region may be changed dynamically, by changing the capacity reduction ratio (1/k), or by enlarging or narrowing the range of the safe memory region, etc.

Embodiments of the present inventive concept can be applied to a variety of memory devices in which the cell hammer phenomenon may occur, without any particular restriction. For example, embodiments of the present inventive concept are applicable to a random access memory (RAM), such as dynamic random access memory (DRAM), static random access memory (SRAM), etc., a programmable ROM, a flash memory, etc. Embodiments of the present inventive concept are also applicable to a memory chip, or a memory module in which several memory chips are integrated. In addition, embodiments of the present inventive concept are also applicable to a three dimensional memory having a plurality of vertically stacked semiconductor dies.

Embodiments of the present inventive concept can also be applied to and implemented by a wide variety of computing systems. The computing systems may include a personal computer (PC), a server computer, a workstation, a laptop computer, a mobile phone, a smart phone, a personal digital assistant (PDA), a portable multimedia player (PMP), a digital camera, a digital TV, a set-top box, a music player, a portable game console, a navigation system, etc.

In addition, embodiments of the present inventive concept can be executed by a variety of processors. The processor should be capable of executing various computing functions, such as specific calculations or tasks. For example, the processor can be a microprocessor or a central processing unit (CPU). Depending on applications, the processor may comprise a single core, or multi-core such as dual-core, quad-core, hexa-core, etc. In addition, although exemplary embodiment illustrated the computing apparatus as having a single processor, embodiments are not limited thereto, and a computing apparatus can include a plurality of processors according to applications. In addition, according to an embodiment, the processor may further include an internal or external cache memory.

In the drawings of exemplary embodiments, although the processor is illustrated as an element separate from the memory controller for controlling the operation of the memory device, the processor may contain the memory controller. A memory interface between the memory controller and the memory device may be implemented by a single channel including a plurality signal lines, or a plurality of channels. In addition, one or more of the memory modules may be connected to each channel. Depending on applications, the memory controller may be located in the input/output hubs.

The foregoing is illustrative of exemplary embodiments of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of controlling access to a memory device of a computing apparatus, the method comprising:
   setting at least a subset of memory cells of the memory device to an enabled state and a remainder of the memory cells to a disabled state, by
      setting at least a partial region of the memory cells to a safe memory region and a remaining region of the memory cells to a normal memory region;
      setting a subset of memory cells of the safe memory region to the enabled state and a remainder of the memory cells of the safe memory region to the disabled state; and
   setting all memory cells of the normal memory region to the enabled state, wherein enabled memory cells are accessible for data writing and reading and disabled memory cells are inaccessible;
   setting the enabled memory cells to the disabled state and the disabled memory cells to the enabled state during a boot process of the computing apparatus; and
   controlling access to the memory cells of the memory device by
      mapping a memory cell address to an address of an enabled memory cell based on a safe address mapping algorithm wherein a memory cell address converted by the mapping is used to access memory cells of the safe memory region, when the memory cell address being accessed belongs to the safe memory region; and
      using the memory cell address without conversion to a different address, to access memory cells of the normal memory region, when the memory cell address being accessed belongs to the normal memory region, wherein access to the enabled memory cells is allowed and access to disabled memory cells is prevented,
   wherein the enabled memory cells are spaced apart from each other by at least one disabled memory cell in a horizontal and/or vertical direction,
   wherein the safe address mapping algorithm comprises steps for:
      calculating a first remainder by dividing a total number of columns in a cell array of the memory device by k;
      converting a memory cell address, Addr, to a value calculated by multiplying the memory cell address Addr by k, when said first remainder is not equal to zero;
      calculating a second remainder by dividing a current row number by 2, when said first remainder is equal to zero;
      converting the memory cell address, Addr, to a value of k*Addr−m, when said second remainder is equal to zero; and
      converting the memory cell address, Addr, to the value calculated by multiplying the memory cell address Addr by k, when said second remainder is not equal to zero,
   wherein k is an inverse of a capacity reduction ratio of the safe memory region and is a natural number greater than 1, and m is a natural number less than k.

2. The method of claim 1, wherein a safe address mapping filter implemented based on the safe address mapping algorithm is incorporated into the memory device,
   wherein the safe address mapping filter receives a memory cell address to be accessed and performs address mapping with respect to the enabled memory cells.

3. The method of claim 1, wherein a safe address mapping filter implemented based on the safe address mapping algorithm is incorporated into a memory controller of the computing apparatus,
   wherein the safe address mapping filter receives a memory cell address and performs address mapping with respect to the enabled memory cells.

4. The method of claim 1, further comprising:
   providing the memory device with safe address mapping information of a basic input/output system (BIOS) based on BIOS setting information for capacities of the safe memory region and the normal memory region of the memory device during a boot process of the computing apparatus;
   requesting, by a program, activation of the safe address mapping information by calling the BIOS while an operating system (OS) is run; and
   dividing the memory device into the safe memory region and the normal memory region by activating the safe address mapping information provided to the memory device by the BIOS,
   wherein the safe memory region and the normal memory region are separately accessible.

5. The method of claim 1,
   wherein a safe address mapping filter for performing the setting step and the controlling step is incorporated into a memory management unit of an operating system (OS) to be run in the computing apparatus; and the method further comprises
   enabling the safe address mapping filter to map a memory cell address requested by hardware of the computing apparatus to an address of the enabled memory cells and return a converted memory cell address to the hardware,
   wherein the hardware accesses the memory device based on the returned memory cell address.

6. The method of claim 5, wherein the safe address mapping filter comprises a logic for,
   calculating a first remainder by dividing a total number of columns in a cell array of the memory device by k,
   converting a memory cell address, Addr, to a value calculated by multiplying the memory cell address Addr by k, when said first remainder is not equal to zero,
   calculating a second remainder by dividing a current row number by 2, when said first remainder is equal to zero,
   converting the memory cell address, Addr, to a value of k*Addr−m, when said second remainder is equal to zero, and
   converting the memory cell address, Addr, to the value calculated by multiplying the memory cell address, Addr, by k when the second remainder is not equal to zero, wherein k is an inverse of a capacity reduction ratio of the safe memory region and is a natural number greater than 1, and m is a natural number less than k.

7. The method of claim 1,
wherein a basic input/output system (BIOS) of the computing apparatus includes a safe memory region setting menu; and
the method further comprises,
during a boot process of the computing apparatus,
receiving a selected option for setting the safe memory region from the safe memory region setting menu, and
storing capacity information of the safe memory region and the normal memory region and a capacity reduction ratio in the BIOS, based on the selected option.

8. The method of claim 7, further comprising:
updating capacity information of the memory device by providing the memory device with the capacity information of the safe memory region and the normal memory region; and
during a reboot process of the computing apparatus, reading updated capacity information of the memory device from the memory device.

9. A method of controlling access to a memory device of a computing apparatus, the method comprising:
setting at least a subset of memory cells of the memory device to a safe memory region and a remainder of the memory cells to a normal memory region;
setting a subset of memory cells of the safe memory region to an enabled state and a remainder of the memory cells of the safe memory region to a disabled state;
setting all memory cells of the normal memory region to the enabled state; and
controlling access to memory cells of the safe memory region by
mapping a memory cell address to an address of an enabled memory cell based on a safe address mapping algorithm wherein a memory cell address converted by the mapping is used to access memory cells of the safe memory region, when the memory cell address being accessed belongs to the safe memory region; and
using the memory cell address without conversion to a different address to access memory cells of the normal memory region, when the memory cell address being accessed belongs to the normal memory region, wherein access to enabled memory cells is allowed and access to disabled memory cells is prevented,
wherein the enabled memory cells of the safe memory region are spaced apart from each other by at least one disabled memory cell in a horizontal and/or vertical direction,
wherein the safe address mapping algorithm comprises steps for,
calculating a first remainder by dividing a total number of columns in a cell array of the memory device by k,
converting the memory cell address, Addr, to a value calculated by multiplying the memory cell address Addr by k, when said first remainder is not equal to zero,
calculating a second remainder by dividing a row number to be currently accessed by 2, when said first remainder is equal to zero,
converting the memory cell address, Addr, to a value of k*Addr−m, when said second remainder is equal to zero, and
converting the memory cell address, Addr, to the value calculated by multiplying the memory cell address, Addr, by k when the second remainder is no equal to zero,
wherein k is an inverse of a capacity reduction ratio of the safe memory region and is a natural number greater than 1, and m is a natural number less than k.

10. The method of claim 9, wherein a safe address mapping filter implemented based on the safe address mapping algorithm is incorporated into any one of the memory device and a memory controller of the computing apparatus,
wherein the safe address mapping filter receives a memory cell address to be accessed and performs address mapping with respect to the enabled memory cells.

11. The method of claim 9, wherein a basic input/output system (BIOS) of the computing apparatus includes a safe memory region setting menu; and
the method further comprises,
during a boot process of the computing apparatus,
receiving a selected option for setting the safe memory region from the safe memory region setting menu, and
storing capacity information of the safe memory region and the normal memory region and a capacity reduction ratio in the BIOS, based on the selected option.

12. A method of controlling access to a memory device of a computing apparatus, the method comprising:
setting at least a subset of memory cells of the memory device to a safe memory region;
setting a subset of memory cells of the safe memory region to an enabled state and a remainder of the memory cells of the safe memory region to a disabled state, respectively, wherein access to enabled memory cells is allowed and access to disabled memory cells is prevented;
setting a remainder of the memory cells to a normal memory region;
setting all memory cells of the normal memory region to the enabled state; and
mapping a memory cell address to an address of an enabled memory cell based on a safe address mapping algorithm wherein a memory cell address converted by the mapping is used to access information from memory cells of the safe memory region, when the memory cell address being accessed belongs to the safe memory region,
wherein the safe address mapping algorithm comprises steps for,
calculating a first remainder by dividing a total number of columns in a cell array of the memory device by k,
converting the memory cell address, Addr, to a value calculated by multiplying the memory cell address Addr by k, when said first remainder is not equal to zero,
calculating a second remainder by dividing a row number to be currently accessed by 2, when said first remainder is equal to zero,
converting the memory cell address, Addr, to a value of k*Addr−m, when said second remainder is equal to zero, and converting the memory cell address, Addr, to the value calculated by multiplying the memory cell address, Addr, by k when the second remainder is not equal to zero, wherein k is an inverse of a capacity reduction ratio of the safe memory region and is a natural number greater than 1, and m is a natural number less than k.

13. The method of claim 12, further comprising:

using the memory cell address without conversion to a different address to access information from memory cells in the normal memory region, when the memory cell address being accessed belongs to the normal memory region, wherein the enabled memory cells of the safe memory region are spaced apart from each other by at least one disabled memory cell in a horizontal and/or vertical direction.

* * * * *